United States Patent
Johnson et al.

(10) Patent No.: US 10,319,396 B2
(45) Date of Patent: Jun. 11, 2019

(54) TRANSDUCER BAR TRANSLATION SYSTEM AND METHOD OF TRANSLATING A TRANSDUCER BAR

(71) Applicant: Seagate Technology LLC, Cupertino, CA (US)

(72) Inventors: Glenn Johnson, St. Paul, MN (US); Kevin Mayer, Apple Valley, MN (US); Peter Gunderson, Ellsworth, WI (US)

(73) Assignee: Seagate Technology LLC, Cupertino, CA (US)

( * ) Notice: Subject to any disclaimer, the term of this patent is extended or adjusted under 35 U.S.C. 154(b) by 386 days.

(21) Appl. No.: 15/184,576

(22) Filed: Jun. 16, 2016

(65) Prior Publication Data

US 2017/0365284 A1 Dec. 21, 2017

(51) Int. Cl.
*B23P 19/00* (2006.01)
*G11C 5/12* (2006.01)
*G11B 5/127* (2006.01)

(52) U.S. Cl.
CPC .................................. *G11B 5/1272* (2013.01)

(58) Field of Classification Search
CPC .......... B24B 37/11; C23F 11/04; C23F 11/10; C23F 17/00; G11B 5/1272; G11B 5/187; G11B 5/255; G11B 5/3169; G11B 5/40
See application file for complete search history.

(56) References Cited

U.S. PATENT DOCUMENTS

| | | | |
|---|---|---|---|
| 4,612,982 A * | 9/1986 | Grehier | F28F 3/086 165/165 |
| 5,894,218 A | 4/1999 | Farnworth et al. | |
| 5,955,877 A | 9/1999 | Farnworth et al. | |
| 6,210,984 B1 | 4/2001 | Farnworth et al. | |
| 6,667,854 B2 * | 12/2003 | Sato | G11B 5/3163 360/234.5 |
| 6,687,976 B1 * | 2/2004 | Koyama | G11B 5/102 216/22 |
| 6,822,469 B1 * | 11/2004 | Kline | G01R 1/0408 324/750.05 |
| 6,900,495 B2 | 5/2005 | Hofmann et al. | |
| 6,911,388 B2 | 6/2005 | Kee et al. | |
| 6,976,302 B2 * | 12/2005 | Itoh | G11B 5/1272 29/603.15 |
| 7,132,841 B1 | 11/2006 | Bertin et al. | |
| 7,394,268 B2 | 7/2008 | Bertin et al. | |
| 8,040,682 B2 * | 10/2011 | Shimoda | H01L 23/36 257/678 |
| 8,869,387 B2 | 10/2014 | Chong et al. | |
| 9,165,573 B1 * | 10/2015 | Moravec | G11B 5/3173 |
| 2006/0292968 A1 * | 12/2006 | Fujii | B24B 27/06 451/54 |
| 2011/0033331 A1 * | 2/2011 | Tuppen | B22F 3/093 419/8 |

* cited by examiner

*Primary Examiner* — Paul D Kim
(74) *Attorney, Agent, or Firm* — Hall Estill Attorneys at Law

(57) ABSTRACT

A plurality of transducer bars may be concurrently translated from a first orientation to a second orientation by a translation system that has first and second plates. The first plate can have a plurality of first notches with each first notch shaped to hold a transducer bar in a horizontal orientation. The second plate can have a plurality of second notches with each second notch shaped to translate the transducer bar from the horizontal orientation to a vertical orientation.

20 Claims, 4 Drawing Sheets

TRANSDUCER BAR TRANSLATION SYSTEM AND METHOD OF TRANSLATING A TRANSDUCER BAR

SUMMARY

A translation system, in some embodiments, can concurrently translate a plurality of transducer bars from a first orientation to a second orientation. The first plate has a plurality of first notches with each first notch shaped to hold a transducer bar in a horizontal orientation while the second plate has a plurality of second notches with each second notch shaped to translate the transducer bar from the horizontal orientation to a vertical orientation.

DETAILED DESCRIPTION

Various embodiments of the present disclosure are generally directed to a system capable of concurrently translating multiple transducer bars from a horizontal orientation to a vertical orientation.

In the manufacturing of a data storage device with a rotating magnetic media, at least one data transducer is fabricated. The progressive reduction in the size of a data transducer, such as a data reader and/or data writer, has prompted a number of fabrication steps to be carried out with multiple data transducers being physically connected. With decreased manufacturing time being emphasized, it is a continued industry goal to provide structures and methods that reduce the fabrication time of a data transducer.

Accordingly, assorted embodiments fabricate at least one data transducer with a transducer bar translation system that utilizes two different plates with different respective notches that are configured to translate multiple transducer bars concurrently from a horizontal orientation to a vertical orientation. The ability to flip multiple transducer bars simultaneously reduces the handling time associated with fabricating individual data transducers. Also, the concurrent translation of multiple transducer bars can decrease the risk of physical damage and misalignment of a transducer bar.

Figure 1:
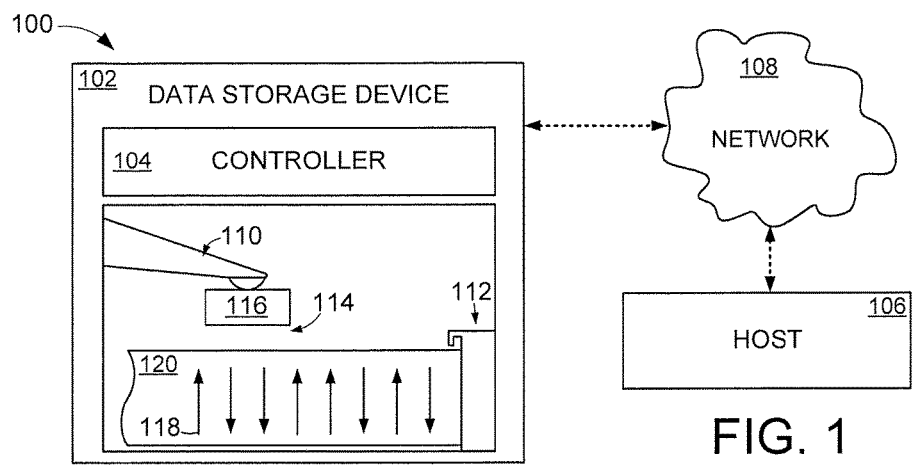
FIG. 1 represents an example data storage system arranged in accordance with various embodiments.

While the various embodiments of the present disclosure are directed to a rotating hard disk drive data storage device, such an environment and system is not required or limiting as a translation system can be utilized in the fabrication of components for other data storage means, such as hybrid disk drives and solid-state memory arrays. FIG. 1 is a block representation of a portion of an example data storage system 100 arranged in accordance with various embodiments to employ a data writer. The data storage system 100 can have any number of data storage devices 102, such as a hard disk drive and hybrid data storage device, that each have at least one local controller 104. The local controller 104 can communicate with one or more remote hosts 106, such as a server and/or node, via a wired or wireless network 108 to direct data access operations to and from the local data storage device 102.

Regardless of the complexity of data access control, data access operations can involve articulation of an actuator assembly 110 and spindle 112 to create an air bearing 114 on which a transducing head 116 flies to access selected data bits 118 stored on the data storage medium 120. The transducing head 116 may employ one or more data transducers and in some embodiments have a data writer 122 and data reader 124 transducers that can individually, and concurrently, access the data bits 118 to store, and retrieve, data as directed by the local controller 104 as well as the remote host 106.

Figure 2A:
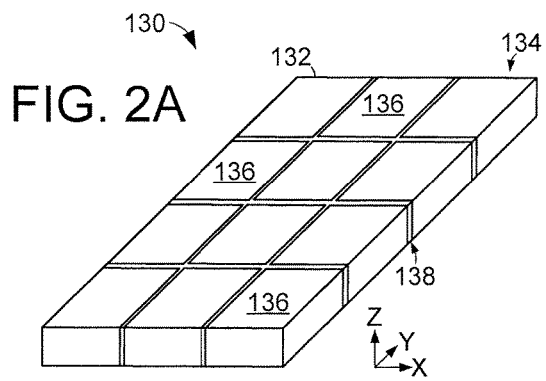
FIGS. 2A-2D respectively show different views of portions of an example data transducer fabrication assembly utilized in accordance with assorted embodiments.

Although the transducing head 116 can be constructed in any number of diverse ways, various embodiments fabricate a plurality of data transducers concurrently. FIGS. 2A-2D respectively display line representations of portions of an example data transducer fabrication assembly 130 that can be processed in accordance with assorted embodiments to produce individual data transducers, such as magnetoresistive data readers. FIG. 2A shows an example transducer block 132 that consists of a plurality of transducer bars 134 that are physically connected.

Figure 2B:
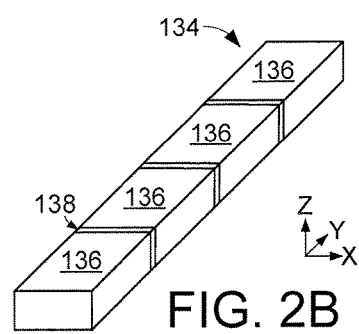

Each transducer bar 134 can comprise a number of data transducers 136, as more clearly illustrated in FIG. 2B, which are separated by a buffer material 138. The buffer material 138 may also separate the respective transducer bars 134 in the transducer block 132 to allow slicing operations to divide the block 132 into the various bars 134. It is contemplated that each data transducer 136 is oriented similarly in the respective transducer bars 134 and block 132 so that an air bearing surface 142 for each data transducer 136 can be concurrently created. That is, each data transducer 136 has an air bearing surface that is aligned along a common Y-Z plane.

Figure 2C:
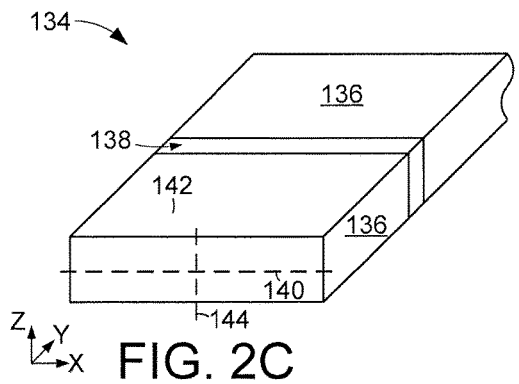
Figure 2D:
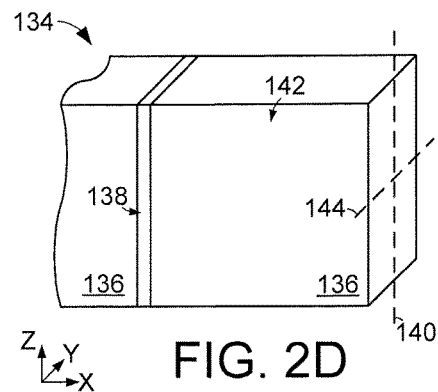

FIGS. 2C and 2D each display isometric views of a transducer bar 134 positioned in horizontal (2C) and vertical (2D) orientations, respectively. A longitudinal axis 140 of the bar 134 is parallel to the air bearing surface 142 of each constituent data transducer 136. A transverse axis 144 is orthogonal to the longitudinal axis 140 and parallel to the Z axis. It is to be understood that the X axis is considered parallel to a horizontal orientation and the Z axis is considered parallel to a vertical orientation. Hence, when the longitudinal axis 140 is parallel to the X axis, the data transducer 136 is in a horizontal orientation and when the transverse axis 144 is parallel to the X axis, the data transducer 136 is in a vertical orientation, which is a 90 degree rotation of the bar 134 with respect to the Z axis.

It is noted that the horizontal orientation of the transducer bars 134 can allow for various air bearing and other processing, such as cleaning and edge definition, to be conducted while the transducer bars 134 are mounted on, or dismounted from, one or more carriers. Subsequent to a dismounting the various transducer bars 134 from a carrier, a dicing operation then separates the individual transducer bars 134 into multiple data transducers 136. While dicing may be conducted while the transducer bars 134 are in a horizontal orientation, such configuration is highly inefficient compared to vertically stacking the transducer bars 134, which allows for maximum packing density while preventing bar contact.

Figure 3A:
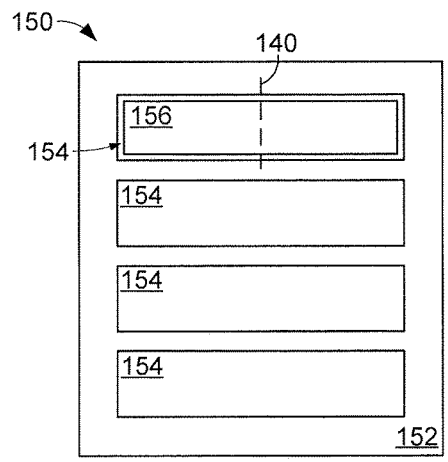
FIGS. 3A and 3B respectively display line representations of portions of an example tool configured in accordance with some embodiments.
Figure 3B:
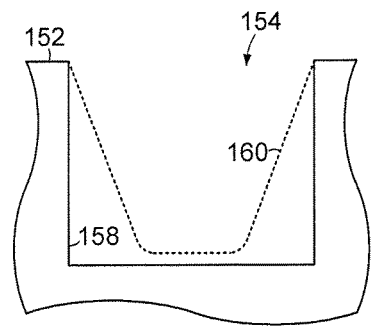

A vertical transducer bar 134 orientation can be maintained in several ways. First, a bar 134 may be manually maintained in a vertical orientation while dicing occurs. Second, a tool may be employed to hold one or more transducer bars 134 in a vertical orientation. FIGS. 3A and 3B respectively illustrate a tool 150 that can serve as an input fixture for automated dicing operations to be conducted in accordance with assorted embodiments. FIG. 3A displays a line representation of a top surface 152 of the tool 150 where at least one recess 154 is shaped to retain a transducer bar 156 in a vertical orientation.

FIG. 3B shows a cross-section of an example recess 154. As a non-limiting embodiment, the recess 154 can have a rectangular shape with linear sidewalls 158 oriented orthogonal to one another. In other embodiments, a recess 154 can have any number of linear and curvilinear surfaces that can be angled to aid in placement of the transducer bar 156 in a vertical orientation, as displayed by segmented line 160.

Although the shape of the recess 154 can increase the probability that a transducer bar 156 will rest and remain in a vertical orientation, translation of the transducer bar 156 from a horizontal orientation after being dismounted from a carrier to the vertical orientation of in a recess 154 can be problematic. For instance, a horizontal-to-vertical translation can take several minutes to complete, particularly with multiple transducer bars 156 being installed on the tool 150, either with an automated pick-and-place machine or by hand. In the event manual translation is employed, the risk of inadvertent physical trauma, shock, and contamination is possible, which supports the inefficiency of individually translating transducer bars 156.

Figure 4:
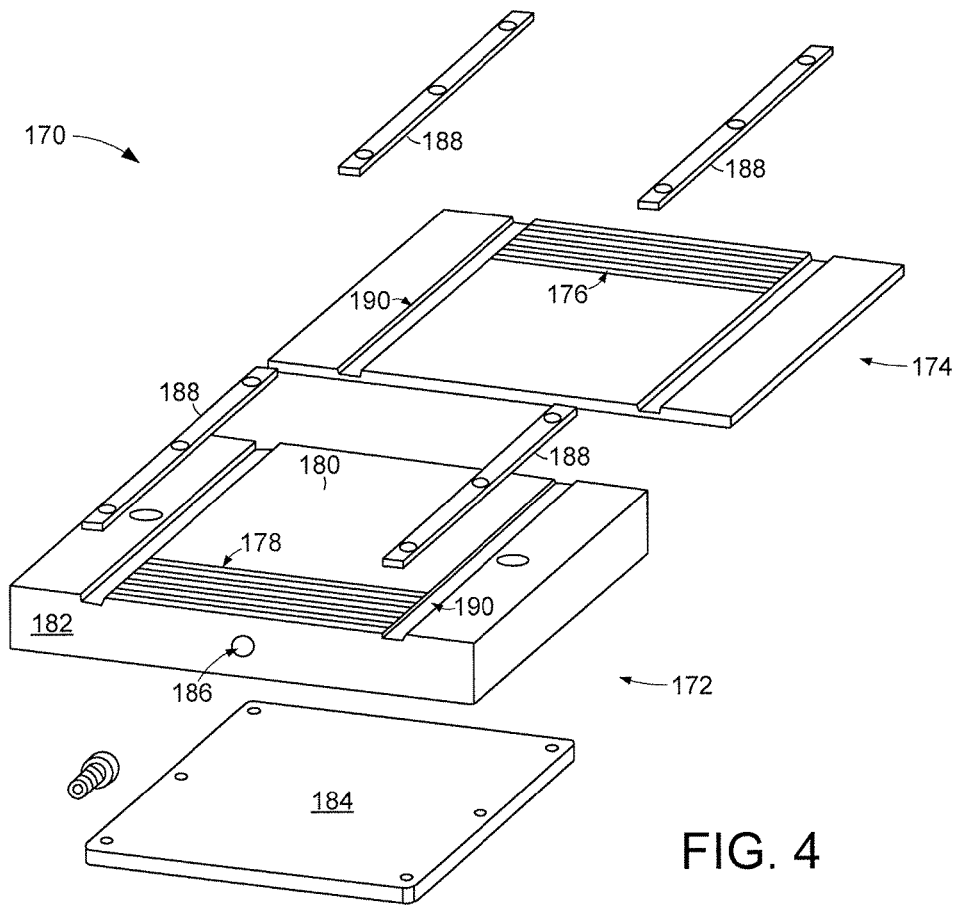
FIG. 4 illustrates an exploded view line representation of an example translation system constructed and operated in accordance with various embodiments.

Accordingly, assorted embodiments are directed to a system that concurrently translates multiple transducer bars 156 between different orientations with reduced speed and increased safety compared to individual bar movement. FIG. 4 illustrates an exploded view of an example transducer bar translation system 170 that can optimize the transition between horizontal and vertical orientations in accordance with various embodiments. The translation system 170 consists of first plate 172 that is configured to hold a plurality of transducer bars each in a horizontal orientation until the transducer bars are moved to the second plate 174 where a notch 176 forces the transducer bar into a vertical orientation.

While not required or limiting, the first plate 172 can be an assembly that provides suction to each notch 178 of a housing surface 180 to retain one or more transducer bars in a horizontal orientation. As shown, a first plate 172 assembly can comprise a housing 182 sealed with a bottom cover 184 and accessed by a pressure aperture 186. The housing 182, cover 184, and pressure aperture 186 can operate in concert to supply continuous vacuum pressure to each notch 178. Such pressure can allow a user, such as a manufacturing controller, to selectively hold transducer bars in place despite vibration and/or inversion of the first plate 172. The suction can subsequently be deactivated to dismount the transducer bars from notches 178.

Each plate 172 and 174 has at least one bumper 188 that can prevent unwanted trauma during the transition of the transducer bars from the first plate notches 178 to the second plate notches 176. It is contemplated that a bumper 188 can reside partially or completely in a recess 190 and can be constructed of a material that is the same, or different, than the material of the housing 182 and/or second plate 174. For example, each bumper 188 can be configured with a harder material than the housing 182 and second plate 174 to allow the bumpers 188 of the respective plates 172 and 174 to make contact in the process of moving transducer bars without damaging the bars or the plates.

The ability to tune the suction pressure and bumper configuration allows the translation system 170 to efficiently move multiple transducer bars in 30 seconds or less, which vastly improves manual or automated translation of individual transducer bars that can take 15 minutes or more. The tuning of the plates 172 and 174 can further decrease the risk of a transducer bar being misaligned in a notch (176/178) or getting damaged due to contact with sharp edges on either plate 172 and 174. It is noted that various embodiments invert the first plate 172 with respect to the second plate 174 so that the respective notches 176 and 178 are vertically aligned along the Z axis.

Figure 5A:
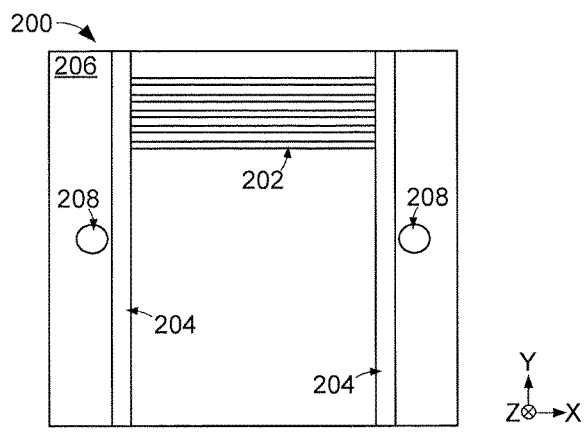
FIG. 5A-5C respectively are line representations of portions of an example plate capable of being employed in the translation system of FIG. 4.
Figure 5B:
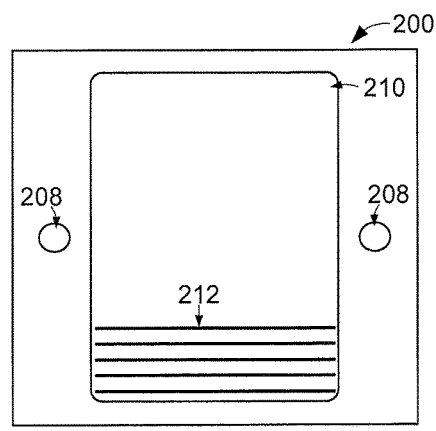
Figure 5C:
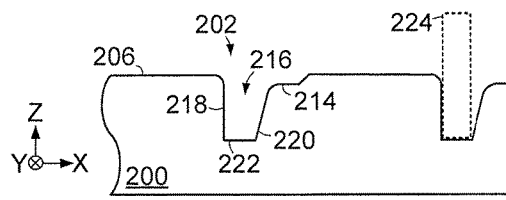

FIGS. 5A-5C respectively convey top (5A), bottom (5B), and cross-sectional (5C) views of an example second plate 200 that can be utilized in the transducer bar translation system 170 in accordance with assorted embodiments. FIG. 5A shows how notches 202 can continuously extend between bumpers 204, which may be recessed into the top plate surface 206 in some embodiments. It is noted that the size and material of the second plate 200 can be arranged in a diverse variety of manners to allow the various notches 202 to be separated, or contacting, to allow efficient translation of multiple transducer bars concurrently from a horizontal orientation to a vertical orientation.

FIG. 5B is a bottom view of the second plate 200 that conveys how mounting holes 208 extend completely through the plate 200 and how the plate 200 can be undercut with a recess 210. The size of the recess 210 can be tuned to provide less overall plate weight without compromising the rigidity of the plate 200. Portions of the recess 210 have grooves 212 that may vertically aligned with the respective notches 202 in the top plate surface 206. The grooves 212 can provide a friction source for movement of the plate 200 in a manufacturing facility and, in some embodiments, extend through to the notches 202 to provide a drainage port for any debris and/or moisture that accumulates in a notch 202.

The cross-sectional view of FIG. 5C displays how the respective notches 202 are tuned for size and shape to optimize translation of multiple transducer bars concurrently. Each notch 202 has a receiving surface 214 that is parallel to the top plate surface 206 to induce rotation of a transducer bar from a horizontal orientation. It is contemplated that the receiving surface 214 is angled with respect to the top plate surface 206, but an angular configuration can inadvertently direct a transducer bar away from the underlying crease region 216 where the transducer bar is forced into a vertical orientation.

Although the size and configuration of the crease region 216 are not limited, various embodiments provide a vertical sidewall 218 opposite a tapered sidewall 220 that meet at a bottom surface 222. The angle of the tapered sidewall 220 can be tuned with respect to the top plate surface 206 to provide minimal trauma to a transducer bar as is rotates into the vertical orientation, which is illustrated by segmented box 224. The assorted surfaces of each notch 202 can be linear, curvilinear, or a combination of the two to allow gravity to carry out the 90 degree rotation of the transducer bar. That is, the receiving surface 214 and crease region 216 can be shaped with a varying width 226 and depth 228 to ensure gravity reliably translates a transducer bar into the vertical orientation.

The use of gravity to induce rotation of the transducer bars allows for efficient translation of multiple transducer bars simultaneously and with minimal risk of misalignment due to equipment error. In contrast, a pick-and-place automated system would take much longer and risk damaging the transducer bar with any minor misplacement of the second plate 200. Hence, the gravity-powered second plate 200 notches 202 can accommodate and correct minor misalignments between a transducer bar and the notch 202 due to the tuned configuration of the receiving surface 214 and crease region 216.

Figure 6A:
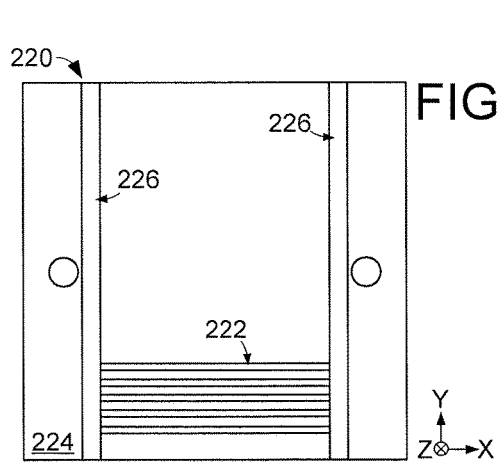
FIGS. 6A-6C respectively convey line representations of portions of an example plate capable of being employed in the translation system of FIG. 4.
Figure 6C:
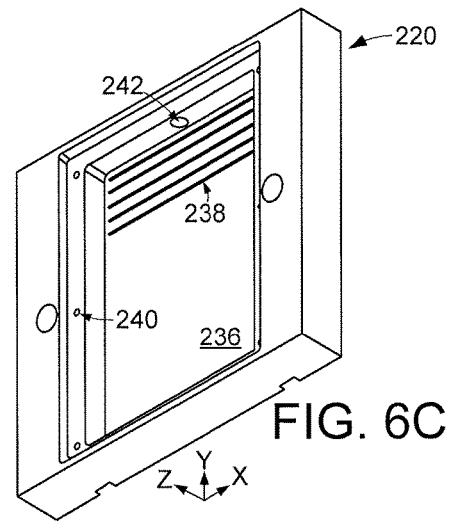
Figure 6B:
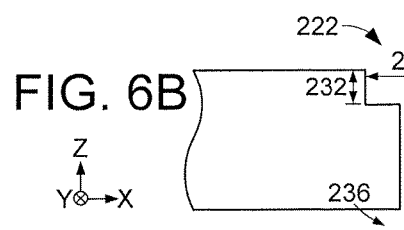

FIGS. 6A-6C respectively display top (6A), cross-sectional (6B), and isometric (6C) views of an example first plate 220 that can be employed in the transducer bar translation system 170 in accordance with various embodiments. The top view of FIG. 6A shows how a plurality of notches 222 are separated on a top plate surface 224 between bumpers 226. It is noted that while the position and material of the bumpers 226 and notches 222 on the top plate surface 224 can match the configuration of the notches 202 and bumpers 204 so that the respective notches 202 and 222 align when the bumpers 204 and 226 contact one another.

While the position of the notches 222 and 202 can match, the respective shapes are different. FIG. 6B shows how each notch 222 has a rectangular shape with linear sidewalls 228 defining a uniform depth 230 and width 232 that is sized so that a single transducer bar fits in each notch 222 in a horizontal orientation. That is, each notch 222 has a size and shape that makes contact with a transducer bar on multiple different surfaces when the transducer bar is in a horizontal orientation, as illustrated by segmented box 234. Although the linear sidewalls 228 are shown oriented perpendicular to the top plate surface 224, such configuration is not required as any sidewall 228 can be oriented at a non-normal angle with respect to the top plate surface 224.

It is contemplated that at least one notch 222 utilizes friction forces provided by contact between a transducer bar and the notch sidewalls 228 to retain the transducer bar in a horizontal orientation until gravity pulls the transducer bar from the notch 222 and into a notch 202 of the second plate 200. In the non-limiting embodiment shown in FIG. 6B, each notch 222 is connected to a vacuum chamber 236 via a suction aperture 238 that continuously extends from the respective notches 222 to create a pressure pathway. The suction apertures 238 can be similarly, or dissimilarly, sized to allow ample vacuum pressure to retain a transducer bar in the notch 222 despite the first plate 220 being inverted. In other words, the suction apertures 238 can have a diameter that results in a vacuum pressure that overcomes the weight of the transducer bar plus gravity.

The suction apertures 238 in FIG. 6B are shown to be separate, but such configuration is not required as more than one aperture may connect between the respective notches 222 and the vacuum chamber 236. The isometric view of FIG. 6C shows a bottom side of the first plate 220, opposite the top plate surface 224. The vacuum chamber 236 is illustrated as a contained recess that can be sealed by one or more covers, such as a single door or a lamination of multiple different layers. A cover can be seal to vacuum chamber 236 via any number of fixture features 240, which may be fasteners, glue, or gaskets.

When a cover is affixed to seal the vacuum chamber 236, air movement is restricted between an inlet port 242 and the respective suction apertures 238. The control of pressure in the vacuum chamber 236 allows a host to dictate when transducer bars will be held in the various notches 222. The interior shape and size of the vacuum chamber 236 may be tuned to optimize the flow of air to the suction apertures 238 and ensure sufficient pressure is available to hold multiple transducer bars, such as four or more transducer bars in separate notches 222 concurrently.

Figure 7A:
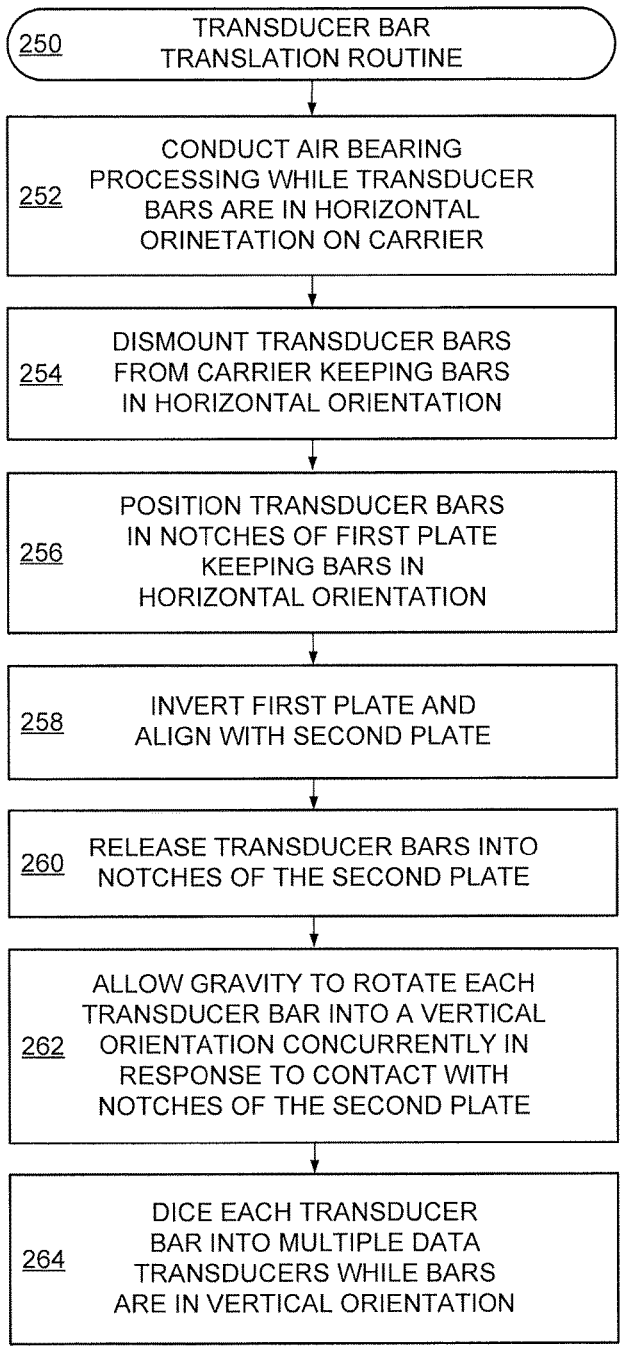
FIGS. 7A and 7B respectively show a flowchart and representative drawings for an example transducer bar translation routine performed in accordance with various embodiments.
Figure 7B:
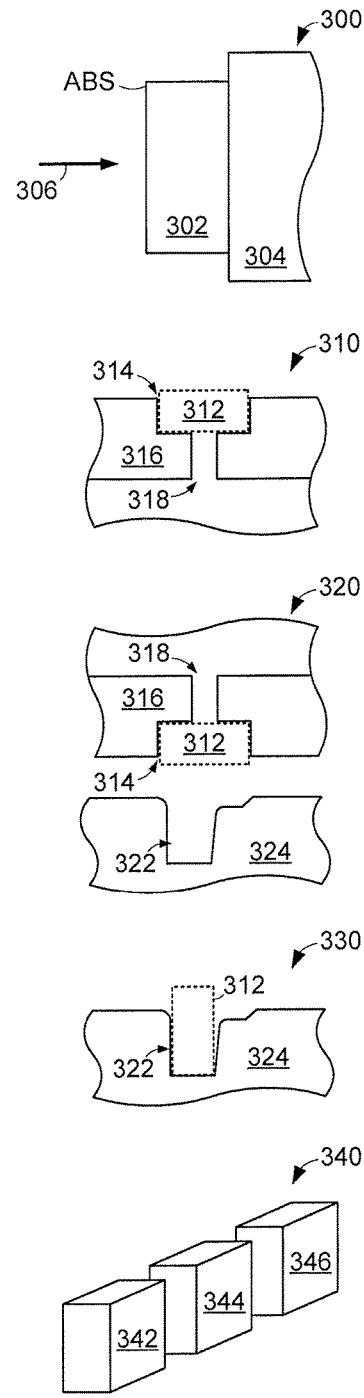

FIGS. 7A and 7B are respectively a flowchart and representative drawings for an example transducer bar translation routine 250 that can be carried out by a translation system in accordance with assorted embodiments. The routine 250 conducts at least one air bearing processing operation in step 252 on a plurality of transducer bars while each transducer bar is in a horizontal orientation. Assembly 300 shows how a transducer bar 302 can be affixed to a carrier 304 for processing. It is noted that the horizontal orientation of the transducer bar 302 is relative to the direction of processing, which is illustrated by arrow 306.

Subsequent to transducer bar processing operation(s), step 254 dismounts each transducer bar from the carrier so that the bars remain in a horizontal orientation. With a plurality of transducer bars accumulated, step 256 positions the respective transducer bars in notches of a first plate while the transducer bars remain in the horizontal orientation. Assembly 310 conveys how transducer bars 312 can be retained in notches 314 of a first plate 316. It is noted that step 256 may employ suction to hold the transducer bars and suction apertures 318 can supply such suction. Although the first plate in step 256 can concurrently hold any number of transducer bars, various embodiments configure the first plate to concurrently hold four transducer bars in four separate notches.

The populated first plate is then inverted in step 258 and positioned proximal to a second plate so that notches of the respective plates are vertically aligned. Assembly 320 displays how the first plate 316 positions each transducer bar 312 above the shaped notches 322 of the second plate 324. It is noted that step 258 may involve one or more bumpers of the first and second plates may make contact. Such bumper contact may continue during step 260 where the various transducer bars are released from the first plate into the notches of the second plate. The releasing of the respective transducer bars can occur with the removal of vacuum pressure from the first plate notches and/or via gravity pulling the transducer bars down into the second plate.

Regardless of how the transducer bars arrive in the notches of the second plate, step 262 allows gravity to rotate each transducer bar concurrently 90 degrees into a vertical orientation, as shown in assembly 330. Various embodiments conduct step 262 so that gravity is the only means of translating the transducer bars to the vertical orientation. Thus, no automated machine or manual procedure is employed between the releasing of the transducer bars in step 260 to the vertical orientation of each transducer bar in step 262. As a result, complexity of transducer bar rotation is reduced.

The vertical orientation of each transducer bar allows step 264 to subsequently dice each transducer bar into multiple constituent data transducers after being remounted in a secondary horizontal orientation. Assembly 340 shows how a single transducer bar can produce first 342, second 344, and third 346 data transducers that are each capable of accessing data bits on a magnetic medium, such as medium 120 of FIG. 1. The various steps of routine 250 are not required or limiting and any aspect can be changed or removed just as additional steps can be incorporated. For example, an additional step can remove the vertically orientated transducer bars from the second plate to a dicing tool that facilitates the dicing operation of step 264.

Through the use of shaped notches in first and second plates, horizontal-to-vertical rotation of multiple transducer bars can be conducted simultaneously to save manufacturing time and optimize manufacturing performance. The use of gravity and a shaped notch to rotate a transducer bar can reduce system complexity and minimize the risk of physical trauma to a transducer bar. The ability to tune the configuration of the respective plates and notches can optimize the efficiency of transducer bar vertical translation while reducing the risk of transducer bar misalignment.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
    a first plate having a plurality of first notches with each first notch shaped to hold a transducer bar in a horizontal orientation; and
    a second plate having a plurality of second notches with each second notch shaped with a varying width to translate the transducer bar from the horizontal orientation to a vertical orientation.

2. The apparatus of claim 1, wherein the first and second plates have recesses respectively filled with a bumper feature.

3. The apparatus of claim 2, wherein the bumper feature comprises a different material than the first plate.

4. The apparatus of claim 1, wherein the first notches are separated and parallel to one another on the first plate.

5. The apparatus of claim 1, wherein each of the second notches has a vertical sidewall.

6. The apparatus of claim 1, wherein each of the second notches has a first surface orientated parallel to a top surface of the first plate and a second surface angled with respect to the top surface of the first plate.

7. A system comprising:
    a first plate having a plurality of first notches with each first notch shaped to hold a transducer bar in a horizontal orientation with vacuum pressure; and
    a second plate having a plurality of second notches with each second notch shaped with a varying width to translate the transducer bar from the horizontal orientation to a vertical orientation.

8. The system of claim 7, wherein each transducing bar comprises a plurality of magnetoresistive data readers.

9. The system of claim 7, wherein the first plate is attached to a housing that defines a vacuum chamber contacting a side of the first plate opposite the first notches.

10. The system of claim 9, wherein the vacuum chamber is connected to a pressure source via a tube.

11. The system of claim 7, wherein a portion of each of the first notches continuously extends completely through a thickness of the first plate.

12. A method comprising:
    positioning a plurality of transducing bars in a plurality of first notches of a first plate, each first notch shaped to hold an individual transducer bar in a horizontal orientation; and
    translating each of the plurality of transducing bars from the horizontal orientation to a vertical orientation by moving each transducing bar from the first plate to a second plate having a plurality of second notches with each second notch shaped with a varying width to translate the transducer bar from the horizontal orientation to the vertical orientation.

13. The method of claim 12, wherein the first plate retains each of the plurality of transducing bars in the horizontal orientation with continuous vacuum pressure.

14. The method of claim 12, wherein the first and second plates contact to move the each transducing bar from the first notches to the second notches.

15. The method of claim 12, wherein each of the plurality of transducing bars are concurrently translated from the horizontal orientation to the vertical orientation.

16. The method of claim 15, wherein the plurality of transducing bars comprises 4 separate transducing bars.

17. The method of claim 12, further comprising processing an air bearing for each of the plurality of transducing bars is positioned in the horizontal orientation prior to being moved to the second plate.

18. The method of claim 12, wherein each of the transducing bars is moved from the first plate to the second plate only by gravity.

19. The method of claim 12, wherein the first plate is inverted to move the plurality of transducing bars to the second plate.

20. The method of claim 12, wherein each of the plurality of transducing bars is subsequently diced after being remounted from the vertical orientation to a secondary horizontal orientation.

* * * * *